US007234370B2

(12) United States Patent
Kim

(10) Patent No.: US 7,234,370 B2
(45) Date of Patent: Jun. 26, 2007

(54) ACCELERATOR PEDAL APPARATUS FOR A VEHICLE

(75) Inventor: Sang Jin Kim, Suwon (KR)

(73) Assignee: Kia Motors Corporation, Seocho-Ku, Seoul (KR)

( * ) Notice: Subject to any disclaimer, the term of this patent is extended or adjusted under 35 U.S.C. 154(b) by 122 days.

(21) Appl. No.: 10/882,114

(22) Filed: Jun. 30, 2004

(65) Prior Publication Data

US 2005/0081676 A1 Apr. 21, 2005

(30) Foreign Application Priority Data

Oct. 21, 2003 (KR) ...................... 10-2003-0073387

(51) Int. Cl.
*G05G 1/14* (2006.01)

(52) U.S. Cl. .......................................... 74/513; 74/512

(58) Field of Classification Search .................. 74/512, 74/513, 514, 478
See application file for complete search history.

(56) References Cited

U.S. PATENT DOCUMENTS

| | | | | |
|---|---|---|---|---|
| 2,267,171 A * | 12/1941 | Rubissow | .................... | 74/513 |
| 5,088,343 A * | 2/1992 | Yokoyama | ................... | 74/560 |
| 5,186,076 A * | 2/1993 | Kataumi et al. | .............. | 74/560 |
| 2002/0108464 A1* | 8/2002 | Brock et al. | .................. | 74/512 |

FOREIGN PATENT DOCUMENTS

| | | |
|---|---|---|
| JP | 03-094316 | 4/1991 |
| JP | 07-096766 | 4/1995 |

OTHER PUBLICATIONS

Merriam-Webster OnLine, Apr. 25, 2006, www.m-w.com.*

* cited by examiner

*Primary Examiner*—Richard Ridley
*Assistant Examiner*—Terence Boes
(74) *Attorney, Agent, or Firm*—Morgan Lewis & Bockius LLP

(57) ABSTRACT

An accelerator pedal apparatus of a vehicle is attached with a pedal plate at one end of one side and includes, at another end of the other side a pedal link member having an insertion recess. A weight member is detachable from and attachable to the insertion recess of the pedal link member such that a vibration of the accelerator pedal can be minimized.

4 Claims, 7 Drawing Sheets

ACCELERATOR PEDAL APPARATUS FOR A VEHICLE

CROSS-REFERENCE TO RELATED APPLICATIONS

This application claims priority of Korean Application No. 10-2003-0073387, filed Oct. 21, 2003, the disclosure of which is incorporated herein by reference.

TECHNICAL FIELD OF THE INVENTION

Generally, the present invention relates to an accelerator pedal for a vehicle. More particularly, the accelerator pedal includes weight members of varying weights that are manufactured to be detachable from the pedal. The weight members are attached to or detached from the accelerator pedal based on its specifications.

BACKGROUND OF THE INVENTION

Typically, an accelerator pedal apparatus of a vehicle controls the fuel injection volume delivered to an engine as a throttle body is operated by a cable when a driver presses the accelerator pedal. However, during depression of the accelerator pedal apparatus a vibration from engine is often transferred to the pedal through the cable. Therefore, the driver can feel discomfort through the pedal.

SUMMARY OF THE INVENTION

According to a preferred embodiment, the accelerator pedal apparatus can minimize vibration felt by the driver in the accelerator pedal. The vibrations are minimized by applying weight members of an appropriate weight depending on the vibration of the accelerator pedal. The weight members are attachable to and detachable from the link member of the accelerator pedal. Cost may therefore be reduced by adapting standardized parts.

Preferably, the accelerator pedal apparatus includes a pedal link member attached with a pedal plate at one end. The pedal apparatus also includes an insertion recess formed at the other end. Weight member are detachable from and attachable to the insertion recess of the pedal link member. The weight member includes a weight carrying weight and a case that surrounds the weight. It is desirable that the weight and case are integrated and the case and pedal link member are made of the same material.

An insertion plate is formed on the case to be inserted into the insertion recess. A blocking threshold is formed on a leading edge of the insertion plate to fasten the insertion plate so that it isn't separated from the insertion recess. A lug is formed behind the insertion plate to fasten the insertion plate within the insertion recess. It is also desirable to make the blocking threshold and lug of elastic material.

According to a preferred embodiment, the present invention can minimize vibration of the accelerator pedal by manufacturing weight members with different weights that can be separated from the accelerator pedal and attached or detached thereto. According to the present invention, only one kind of the accelerator pedal is used, however, the weights of the weight member can be attached to and detached from the link member of the accelerator pedal depending on the required specifications to prevent vibration of the accelerator pedal.

BRIEF EXPLANATION OF THE DRAWINGS

For better understanding of the nature and objects of the invention, reference should be made to the following detailed description, taken in conjunction with the accompanying drawings, in which.

DETAILED DESCRIPTION OF PREFERRED EMBODIMENTS

Figure 1:
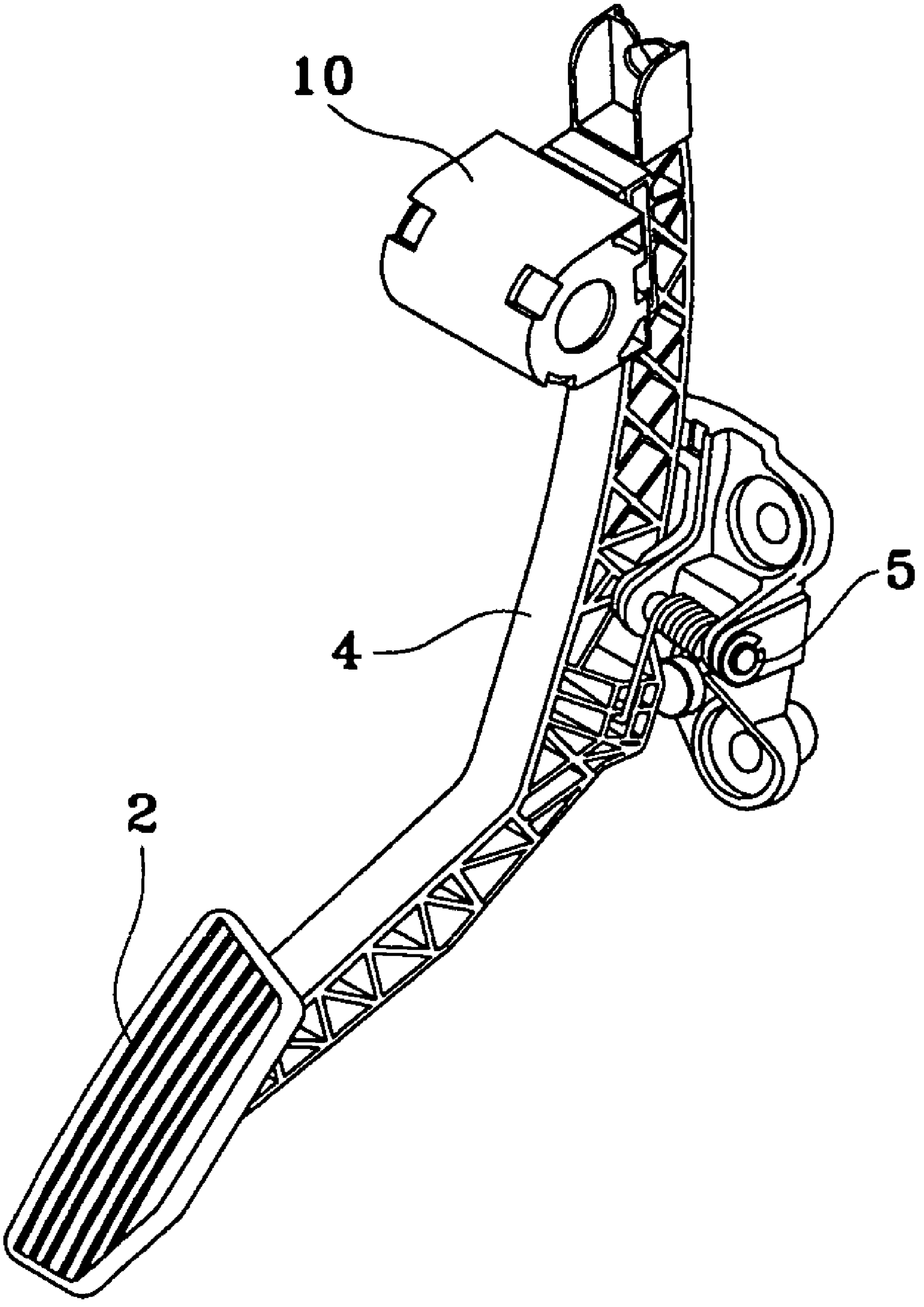
FIG. 1 shows a weight member attached to an accelerator pedal according to an embodiment of the present invention.
Figure 2:
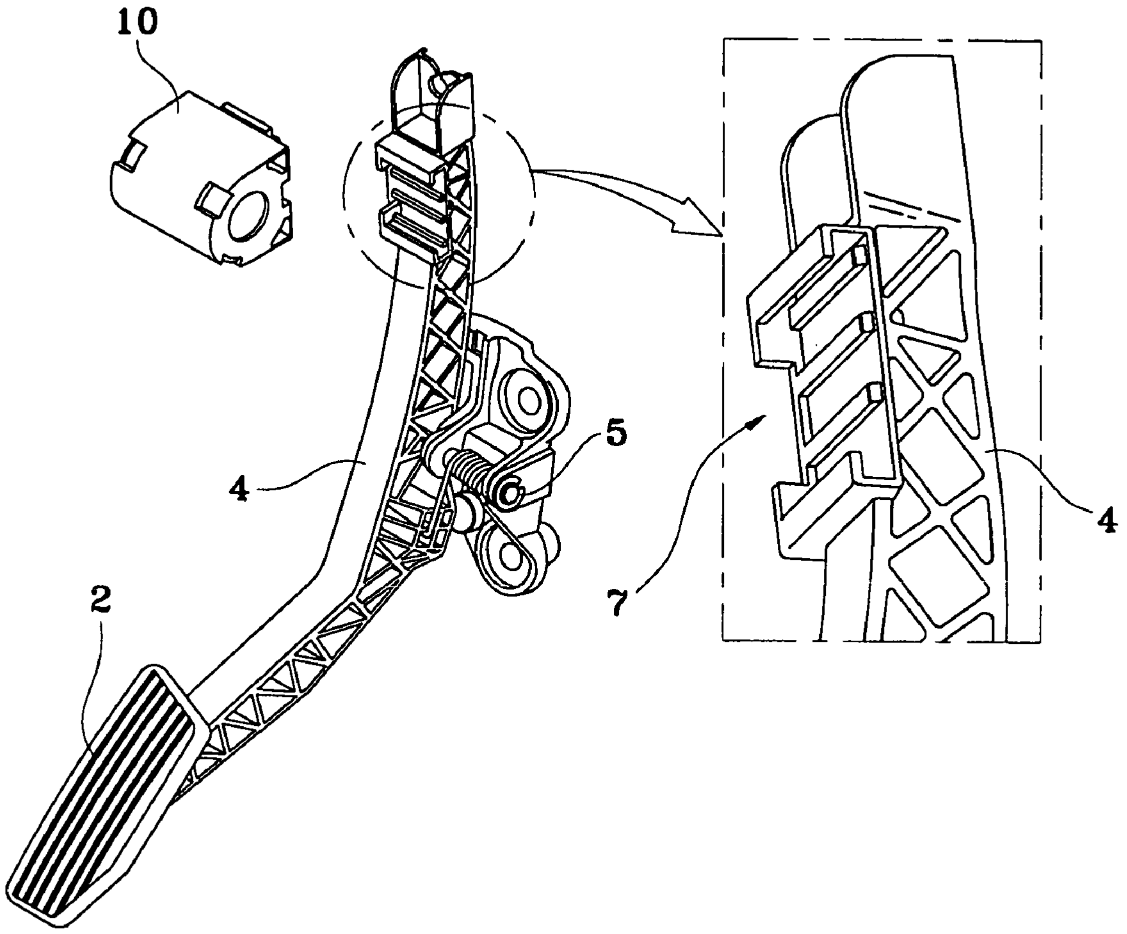
FIG. 2 shows a weight member detached from an accelerator pedal according to an embodiment of the present invention.
Figure 3:
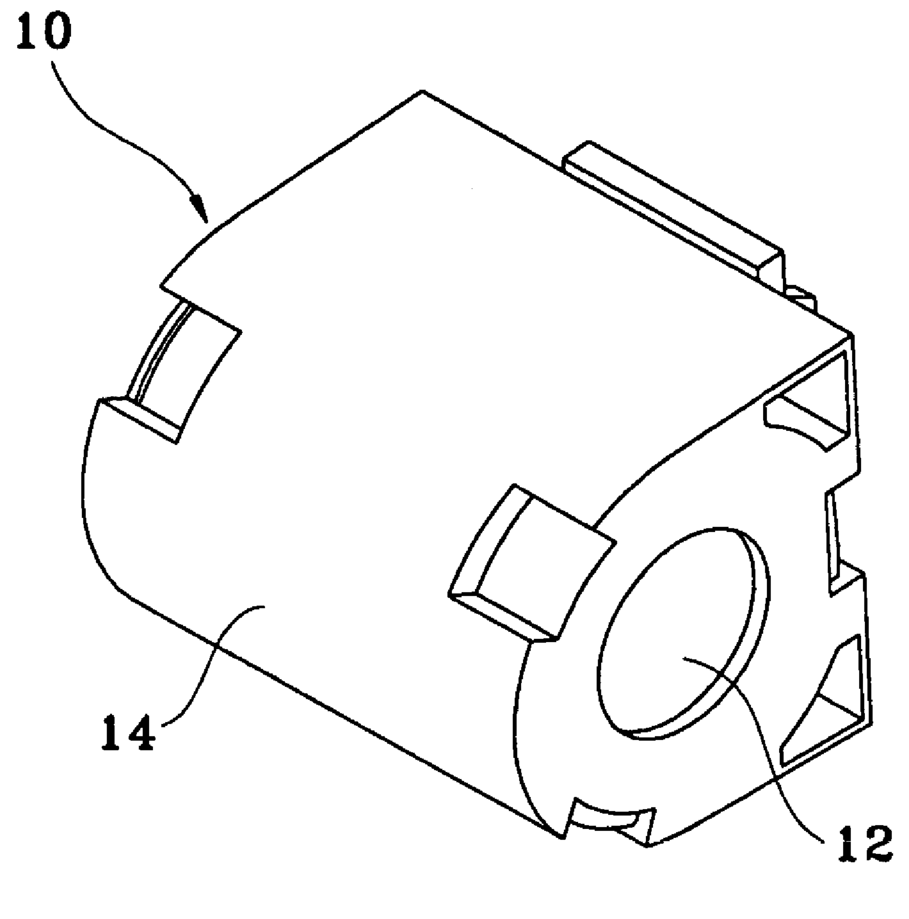
FIG. 3 is a perspective view of a weight member according to an embodiment of the present invention.

According to FIG. 1 a weight member is attached to an accelerator pedal and as shown in FIG. 2, the weight member is detachable from the accelerator pedal. As illustrated in FIGS. 1-7, the accelerator pedal apparatus generally includes a pedal link member 4 attached to a pedal plate 2 at one end portion and includes an insertion recess 7 formed at the other end portion thereof. A weight member 10 is detachable from and attachable to the insertion recess 7 of the pedal link member 4. Preferably, the pedal link member 4 is mounted on the car body using a hinge member 5 at its center and the insertion recess 7 is for attaching and detaching the weight member 10 therefrom.

According to a preferred embodiment, the weight member 10 includes a weight 12 and a case 14 that surrounds the weight 12. It can be desirable to form the weight 12 and case 14 together integrated by injection molding the case 14 inserted with the weight 12. It can be further desirable to manufacture the case 14 from the same material as the pedal link member 4, for example a plastic. It is more likely a gap will be generated between the insertion recess 7 of the pedal link member 4 and the weight member 10 due to vibration of the accelerator pedal when the case 14 and the pedal link member 4 are constructed of different materials. However, it will be appreciated by one of ordinary skill in the art that the components can be made of different materials as well.

Figure 4:
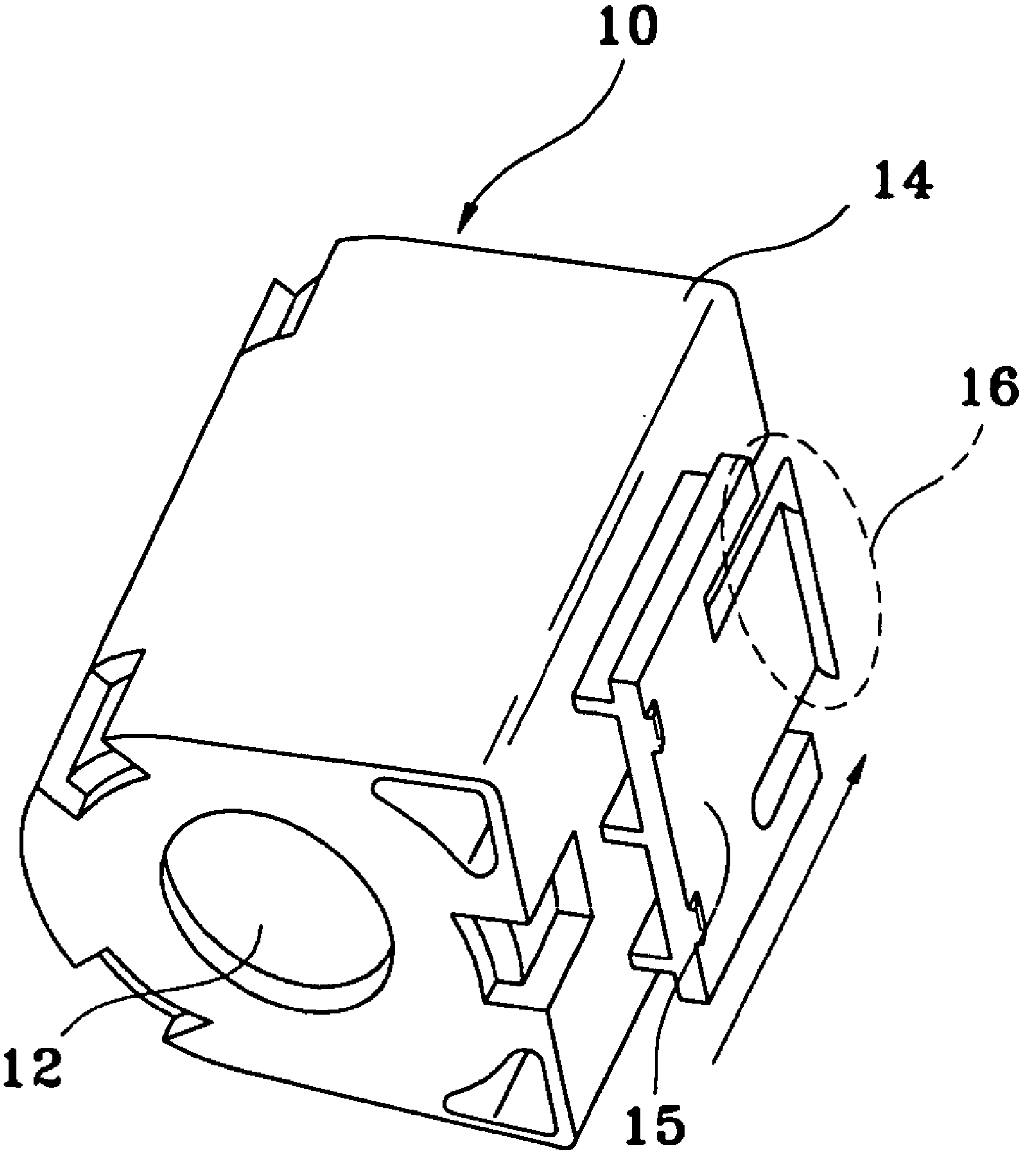
FIG. 4 is a slant view of a first locking means of a weight member according to an embodiment of the present invention.
Figure 5:
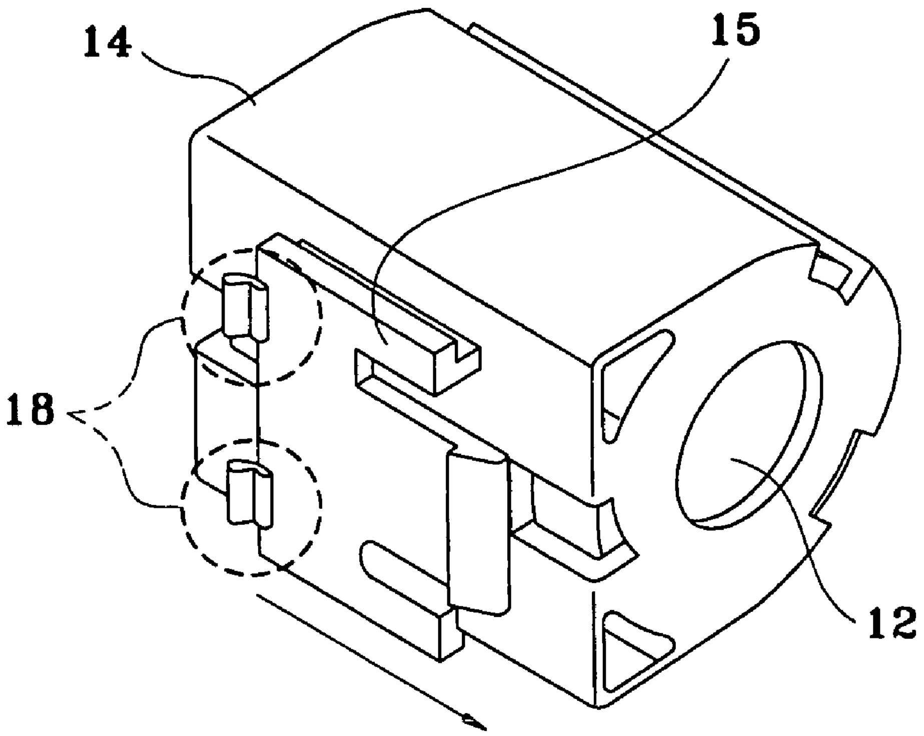
FIG. 5 is a slant view of a second locking means of a weight member according to an embodiment of the present invention.
Figure 6:
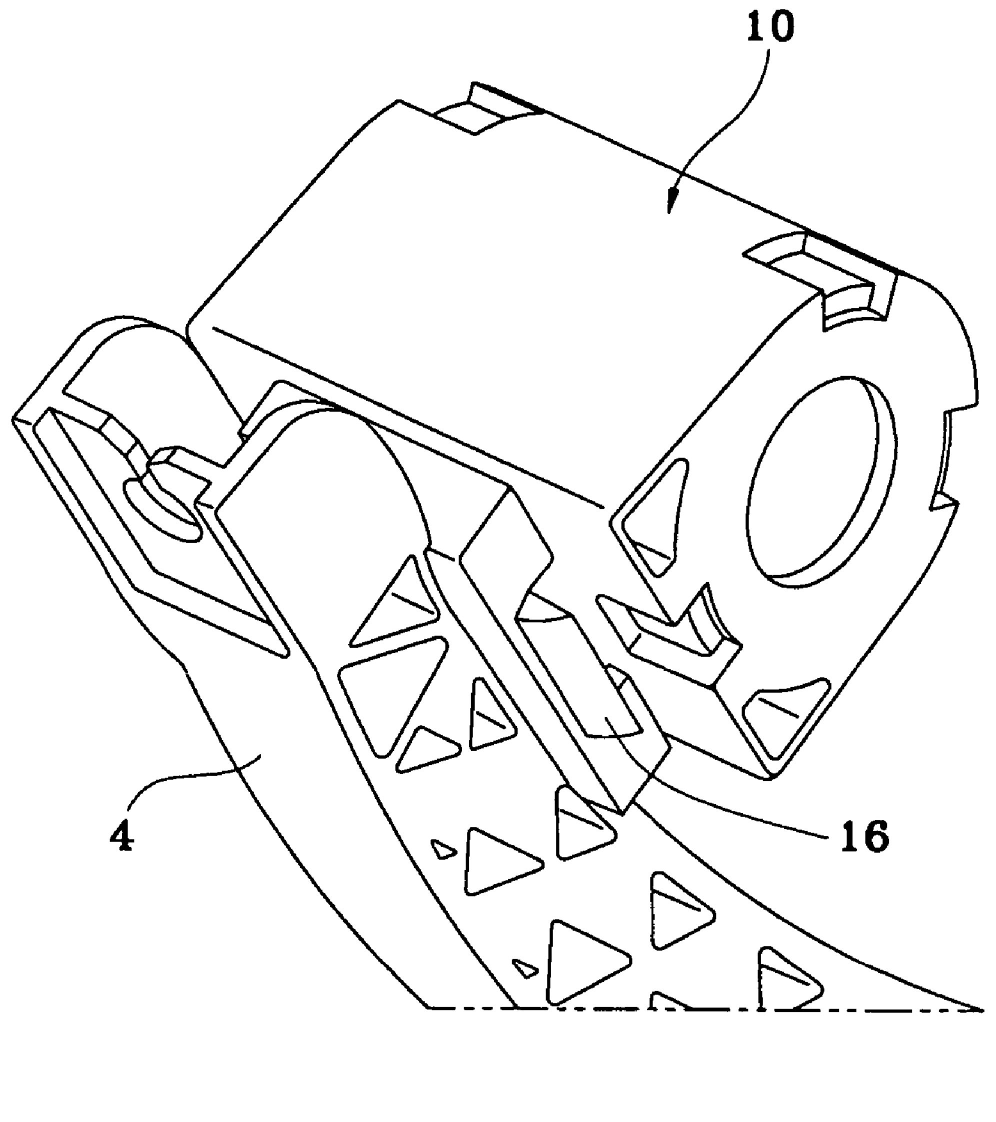
FIG. 6 shows a weight member attached to a pedal link member using a blocking threshold of the weight member according to an embodiment of the present invention.
Figure 7:
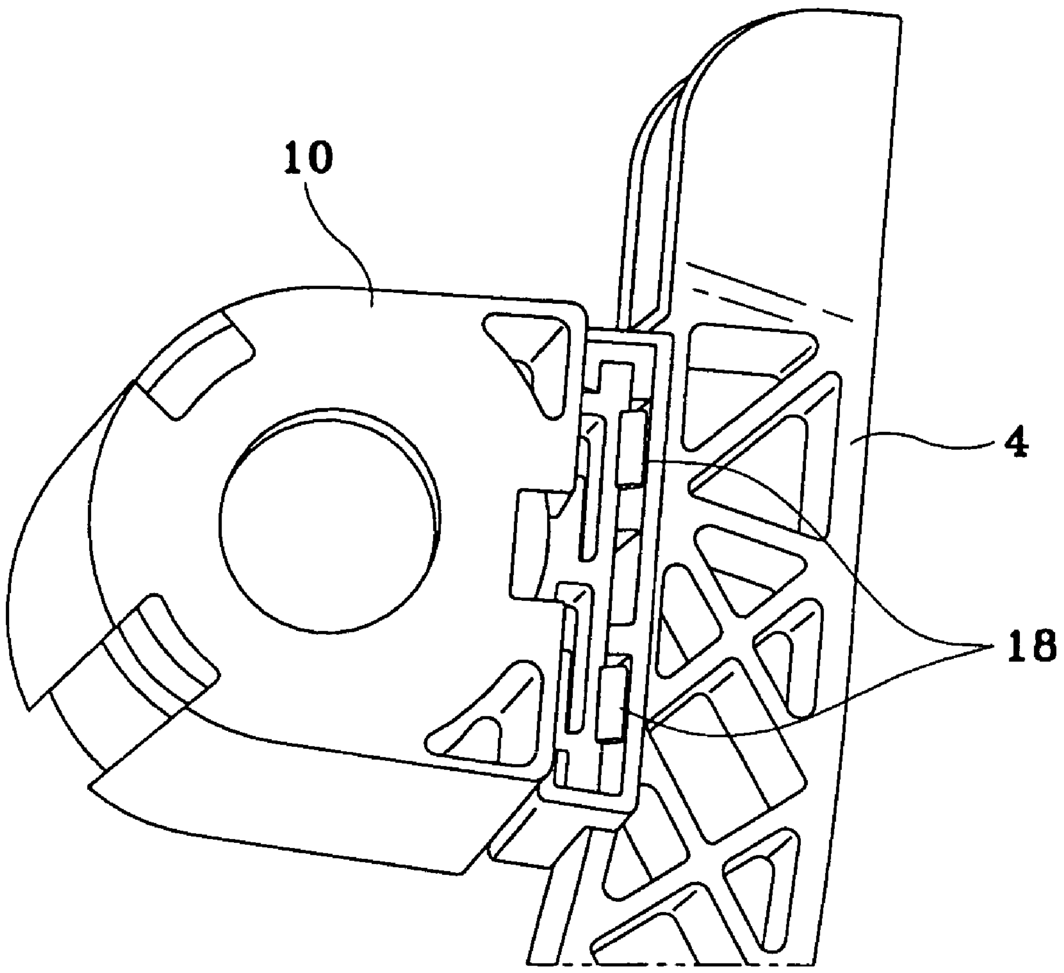
FIG. 7 shows a weight member attached to a pedal link member using a lug of the weight member according to an embodiment of the present invention.

As illustrated in FIGS. 4 and 5, the insertion plate 15 is to be inserted into the insertion recess 7 which is formed on the bottom surface of the case 14 of the weight member 10. A first locking means includes a blocking threshold 16 formed on the leading edge of the insertion plate 15 to fasten the insertion plate 15, inserted into the insertion recess 7, such that it does not separate from the insertion recess 7 after insertion. A second locking means includes a lug 18 formed behind the insertion plate 15 to fasten the insertion plate 15 with the insertion recess 7 so that the insertion plate 15 remains in tight insertion with the insertion recess 7. The blocking threshold 16 and lug 18 are made of elastic materials. Thus, the insertion plate 15 can easily be inserted into the insertion recess 7 and is solidly fastened once it has been inserted.

According to FIGS. 4 and 5, the insertion plate 15 of the weight member 10 is inserted in the insertion recess 7 of the pedal link member 4 in the direction indicated by the arrow. When inserted, the blocking threshold 16 formed on the leading edge of the insertion plate 15 is hooked at the end of the insertion recess 7 and thus the insertion plate 15 is fastened into the insertion recess 7. The insertion plate 15 is held tight in the insertion recess 7 by the lug 18 formed on the rear side of the insertion plate 15. As this double locking structure is applied, separation at the connection between the weight member 10 and the pedal link member 4 from vibration of the accelerator pedal apparatus is minimized. In order to separate the weight member 10 from the pedal link member 4 for disengagement, the insertion plate 15 is pushed separate it from the insertion recess 7 while the blocking threshold 16 formed on the leading edge of the insertion plate 15 is not hooked at the end of the insertion recess 7.

The weight 12 located in the case 14 of the weight member 10 can be manufactured according to varying required specifications such that varying vibrations can be minimized. For example, the weight member can be manufactured depending on the specifications with different weights, thus the attachment and detachment of the pedal link member is possible by selection based on a particular application.

While preferred embodiments of the present invention have been described, this invention is not intended to be limited by the disclosure, but cover modifications and alterations obvious to one of ordinary skill in the art that are encompassed by the appended claims.

According to the accelerator pedal apparatus of the present invention the weights of the weight member can be universally applied to a standard accelerator pedal such that the accelerator pedal does not need to be manufactured in accordance with particular and varying specifications. The accelerator pedal can be fitted with a particular weight of a particular weight member for a particular specification or application, and therefore the manufacturing cost and time is reduced for the accelerator pedal.

What is claimed is:

1. An accelerator pedal apparatus of a vehicle, comprising:

a pedal link member with a pedal plate attached to one end of said pedal link member, the pedal link member including an insertion recess;

a weight member comprising a weight and a case surrounding said weight, wherein said case comprises an insertion plate configured for insertion into and removal from said insertion recess to respectively attach said weight member to and detach said weight member from said insertion recess;

a first locking means formed on a leading edge of said insertion plate to fasten said insertion plate to said insertion recess; and a second locking means formed on a back edge of said insertion plate to fasten said insertion plate to said insertion recess.

2. The accelerator pedal apparatus of a vehicle according to claim 1, wherein said weight is integrally formed with said case.

3. The accelerator pedal apparatus of a vehicle according to claim 1, wherein said first locking means is made of elastic material.

4. The accelerator pedal apparatus of a vehicle according to claim 1, wherein said second locking means is made of elastic material.

* * * * *